(12) United States Patent
Pecht et al.

(10) Patent No.: US 6,626,436 B2
(45) Date of Patent: Sep. 30, 2003

(54) MONITORING SEAL SYSTEM

(75) Inventors: Glenn G. Pecht, Vernon Hills, IL (US); Guy Gardner Williamson, Framingham, MA (US)

(73) Assignee: John Crane Inc., Morton Grove, IL (US)

( * ) Notice: Subject to any disclaimer, the term of this patent is extended or adjusted under 35 U.S.C. 154(b) by 119 days.

(21) Appl. No.: 09/731,306

(22) Filed: Dec. 6, 2000

(65) Prior Publication Data

US 2001/0030396 A1 Oct. 18, 2001

Related U.S. Application Data

(63) Continuation-in-part of application No. 09/606,760, filed on Jun. 29, 2000, which is a continuation of application No. 08/915,300, filed on Aug. 20, 1997, now Pat. No. 6,082,737.
(60) Provisional application No. 60/169,254, filed on Dec. 6, 1999.

(51) Int. Cl.[7] ................................................ F16J 15/34
(52) U.S. Cl. ........................ 277/317; 277/318; 277/319
(58) Field of Search ............................... 277/317, 318, 277/319, 321; 73/756, 714

(56) References Cited

U.S. PATENT DOCUMENTS

| 3,297,329 | A | * | 1/1967 | Smith |
| 3,947,044 | A | * | 3/1976 | Friedrich |
| 4,497,493 | A | * | 2/1985 | Sall et al. |
| 4,643,437 | A | * | 2/1987 | Salant |
| 4,691,276 | A | * | 9/1987 | Miller |
| 5,186,277 | A | * | 2/1993 | Snuttjer |
| 5,762,342 | A | * | 6/1998 | Kakbaker et al. |

FOREIGN PATENT DOCUMENTS

JP  4160320  * 4/1992

* cited by examiner

Primary Examiner—Gary Estremsky
Assistant Examiner—Mark Williams
(74) Attorney, Agent, or Firm—Jenner & Block, LLC

(57) ABSTRACT

A monitoring seal system comprises a seal housing, a seal assembly, a temperature sensor and a controller. The seal assembly sealingly engages a rotary shaft to prevent fluid leakage between the shaft and the housing. The seal assembly has at least one seal. The seal has a primary ring and a mating ring. The temperature sensor senses the temperature in the vicinity of the seal. The controller determines whether an upset condition has occurred based on at least the temperature in the vicinity of the seal.

36 Claims, 7 Drawing Sheets

US 6,626,436 B2

MONITORING SEAL SYSTEM

This application claims the benefits of U.S. Provisional Application No. 60/169,254, filed on Dec. 6, 1999. This application is also a continuation-in-part of copending U.S. application Ser. No. 09/606,760, filed on Jun. 29, 2000, which is a continuation of U.S. application Ser. No. 08/915,300, filed on Aug. 20, 1997, issued on Jul. 4, 2000 as U.S. Pat. No. 6,082,737.

FIELD OF INVENTION

This invention relates to a rotary shaft monitoring seal system, and more particularly to such a monitoring seal system which monitors vibration, temperature and/or pressure at the seal location.

BACKGROUND OF INVENTION

Conventional pump monitoring is most often effected by a person who periodically visits each pump, makes observations of noise and leaks and takes vibration readings with instrumentation utilizing an accelerometer. The information is compared with historical data on that pump to detect trends that could result in failure of the pump bearings, couplings or seals. One problem with this procedure is the time and labor costs involved. Another problem is the fact that the pump is not constantly monitored and so flashing (liquid to vapor transition that causes pulsating leakage and chattering of the seal) and cavitation can occur without detection. Yet another problem is the cost of the accelerometers, usually three, required to make the vibration readings. This expense also marshals strongly against the use of a vibration detector mounted on each pump which could monitor constantly. Also marshalling against permanently installed vibration detectors or other detectors such as temperature and pressure detectors is the cost and effort involved in physically monitoring each detector on or near the housing, bearing or coupling and the need to constantly feed back that output to a central station or computer where the information can be viewed and utilized. Further, the wiring for such systems is costly in time, labor and materials. Separately, the detectors used, whether permanently installed or periodically applied by an operator, generally monitor the bearings or couplings, either directly or through the housing and do not indicate the condition of the seal, which often presages failures in other components of the pump. Finally, the installation of such detectors often involves machining or other intrusive operations for the pumps supplied by the manufacturer.

SUMMARY OF INVENTION

The present invention is directed to a monitoring seal system. The monitoring seal system comprises a seal, housing, a seal assembly, a temperature sensor, an input unit and a controller. The seal assembly sealingly engages a rotary shaft to prevent fluid leakage between the shaft and the housing. The sea4 assembly has at least one seal. The seal has a primary ring and a mating ring. The temperature sensor senses the temperature in the vicinity of the seal. The input unit is for inputting values. The controller determines whether an upset condition has occurred based on at least the temperature in the vicinity of the seal and the values input into the input unit.

DISCLOSURE OF PREFERRED EMBODIMENT

Other objects, features and advantages will occur to those skilled in the art from the following description of a preferred embodiment and the accompanying drawings, in which.

Figure 1:
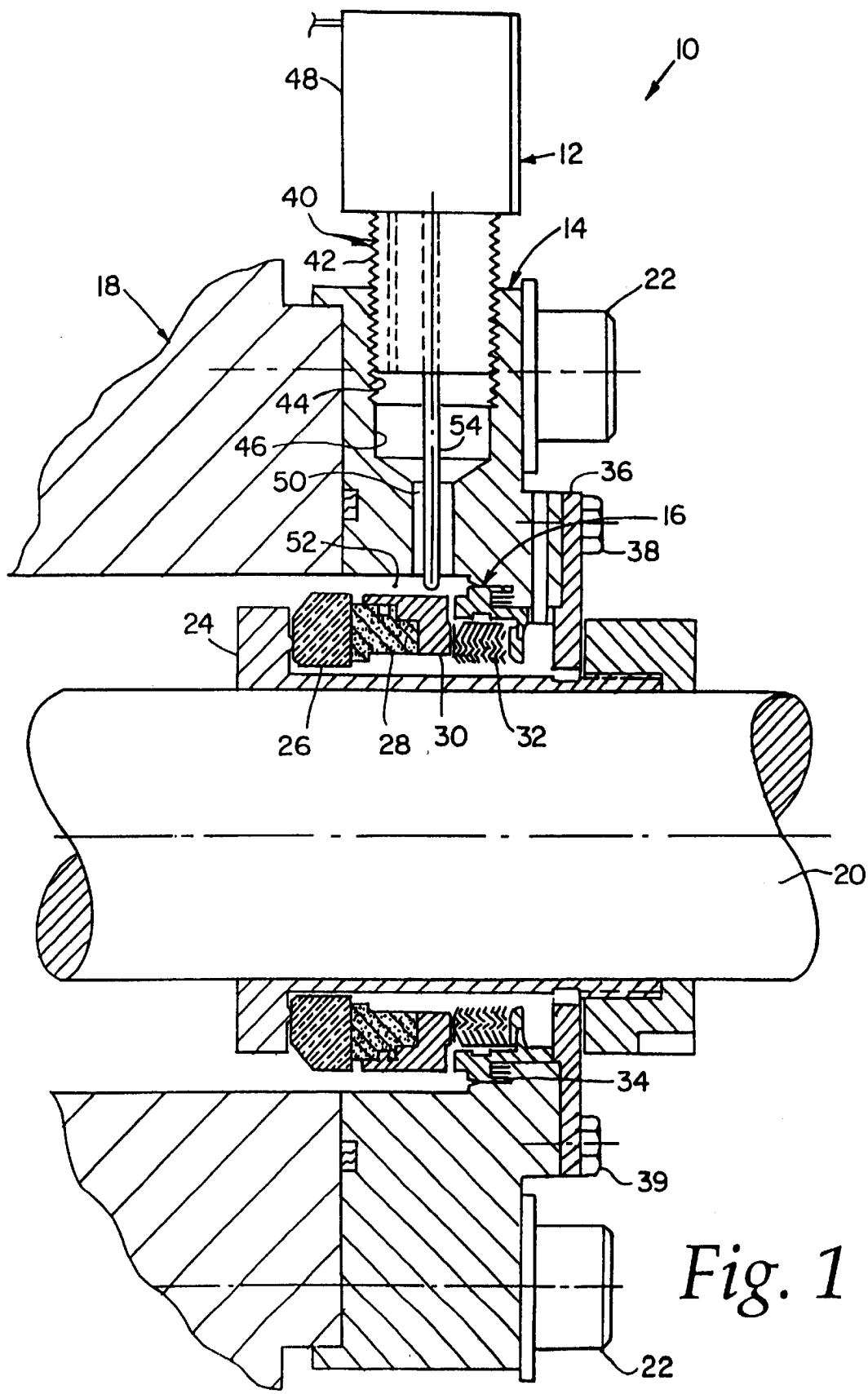
FIG. 1 is a side elevational sectional view of a rotary shaft monitoring seal system according to this invention.

There is shown in FIG. 1 a rotary shaft monitoring seal system 10 according to this invention which includes detector assembly 12, gland plate or seal housing 14 and seal assembly 16 for sealing against fluid flow between machine housing 18 and rotary shaft 20. Seal housing 14 is mounted to machine housing 18 by means of mounting bolts 22. Carried by seal housing 14 is seal assembly 16 which includes metal sleeve 24 fixed to and rotatable with shaft 20, and mating ring 26, typically made of ceramic, fixed to and rotatable with metal sleeve 24 in shaft 20. The remainder of seal assembly 16 is fixed to seal housing 14 and does not rotate with shaft 20. This portion of seal assembly 14 includes a soft, typically carbon, insert 28 which is press-fit into and held by shell 30, attached to which is metal bellows 32; the other end of bellows 32 is attached to adaptor 34, typically made of metal. Shell 30, bellows 32 and adaptor 34 are typically welded together into a single unit. Rear plate 36, held in place by bolts 38 and 39, complete and cover seal assembly 16.

Detector assembly 12 has a lower portion 40 which may be typically threaded at 42 to engage with threads 44 in port 46 of housing 14. Portion 40 is typically in solid contact with housing 14 so that a vibration detector located in upper portion 48 of detector assembly 12 can directly sense the vibrations through housing 14 from shaft 20. Port 46 also may have a hole or passage 50 extending all the way through housing 14 to communicate with the region proximate seal assembly 16 so that, for example, the fluid in area 52 can move up passage 50 into port 46 to be sensed by a pressure sensor in upper portion 48 and temperature probe 54 can extend down to sense the temperature in the vicinity of seal 16. Although the seal assembly in FIG. 1 s shown as a simple one-stage seal, this is not a necessary limitation of the invention as any suitable seal may be used, such as multi-stage seals and more complex seals using barrier fluids. Detector assembly 12 will in any case sense the vibrations coming through seal gland plate or seal housing 14, and the temperature and pressure will be sensed in the vicinity of the seal.

Figure 2:
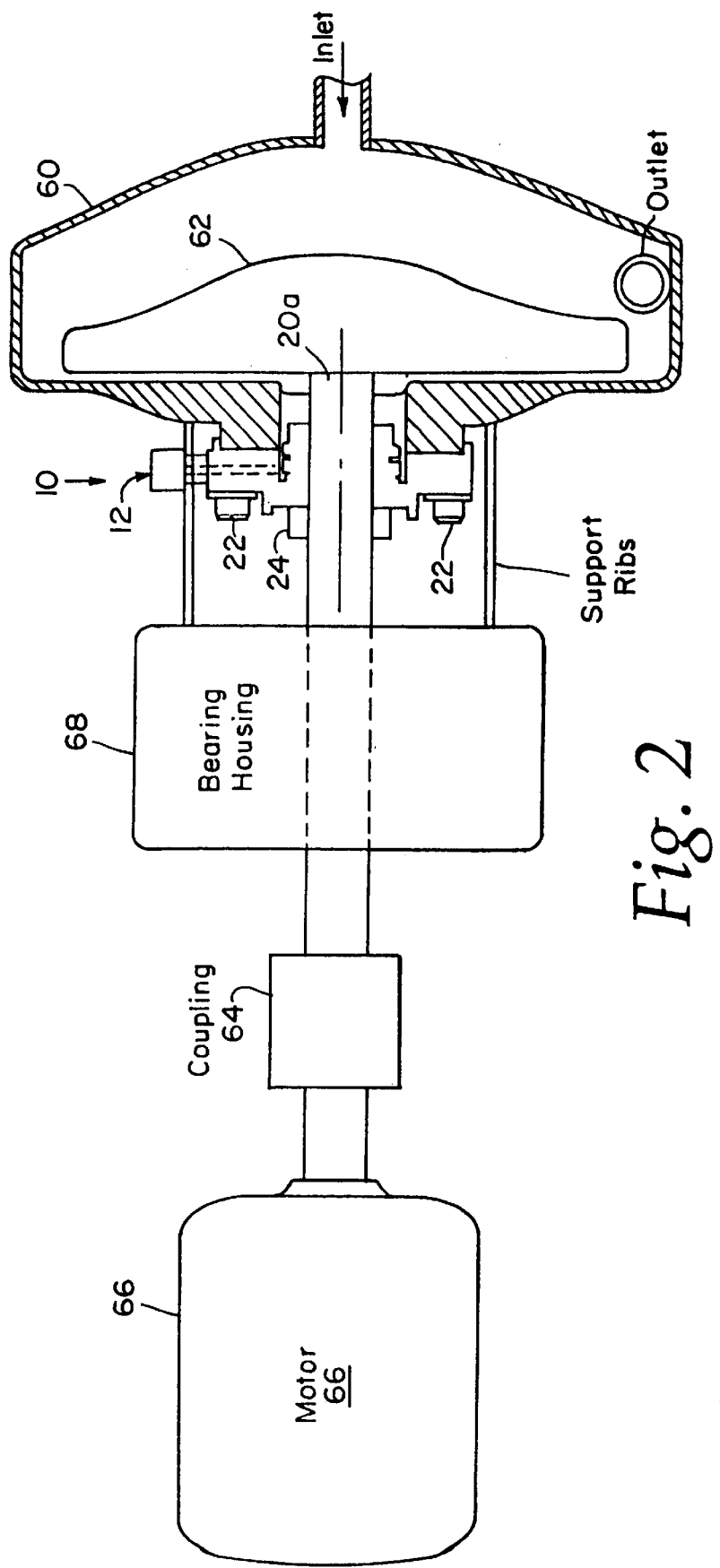
FIG. 2 is a schematic diagram showing the monitoring seal system of FIG. 1 installed between a fluid pump and its drive shaft which is driven by a motor.

Monitoring seal system 10 is typically used with a rotary machine such as pump 60, FIG. 2, whose impeller 62 is mounted on shaft 20a driven through coupling 64 by motor 66. Bearings in bearing housing 68 support shaft 20a. The positioning of the detector assembly in the seal housing, which makes the seal into a monitoring seal system, not only provides easy access to the internal region of the machine where the temperature, pressure and vibration can be meaningfully monitored, it also permits observation of an area, namely the seal, where potential failures can be sensed at the earliest moment. Failure patterns of a bearing or coupling can be sensed by the conditions in the area of the seal assembly even before meaningful indications may be sensible at the bearing housing or coupling.

Figure 3:
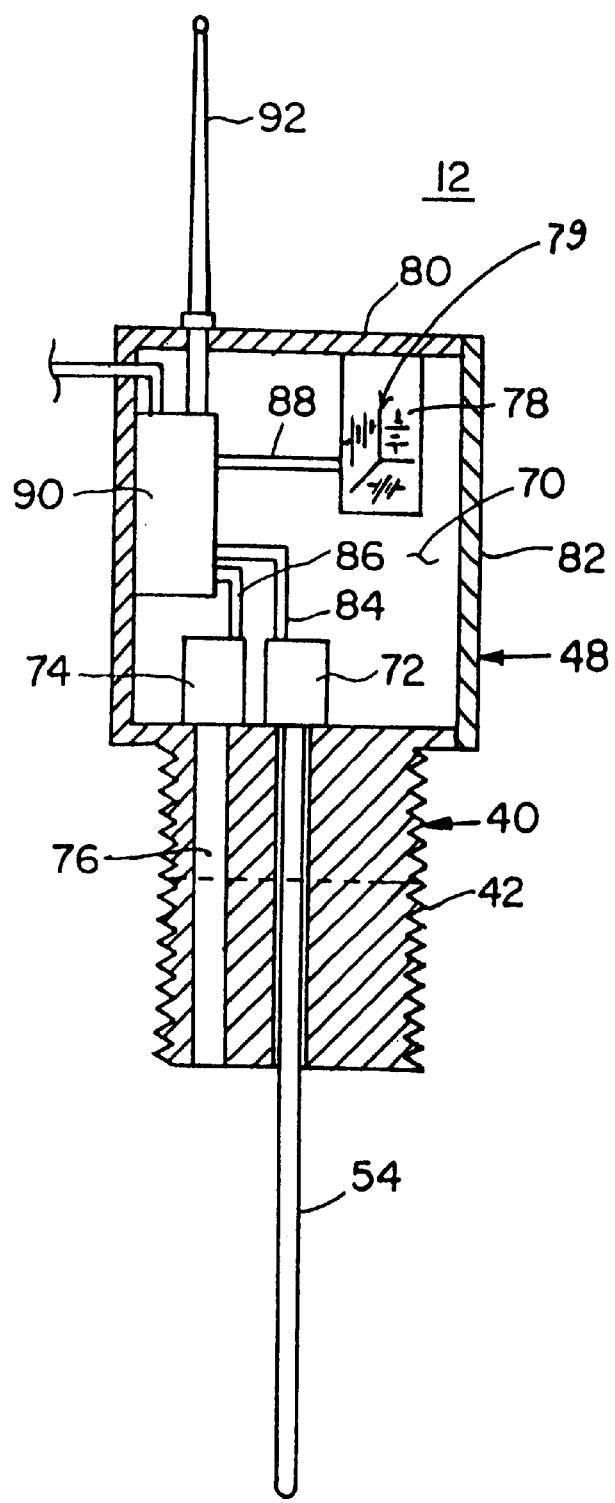
FIG. 3 is a more detailed schematic cross-sectional elevational diagram of the detector assembly of FIG. 1.
Figure 4:
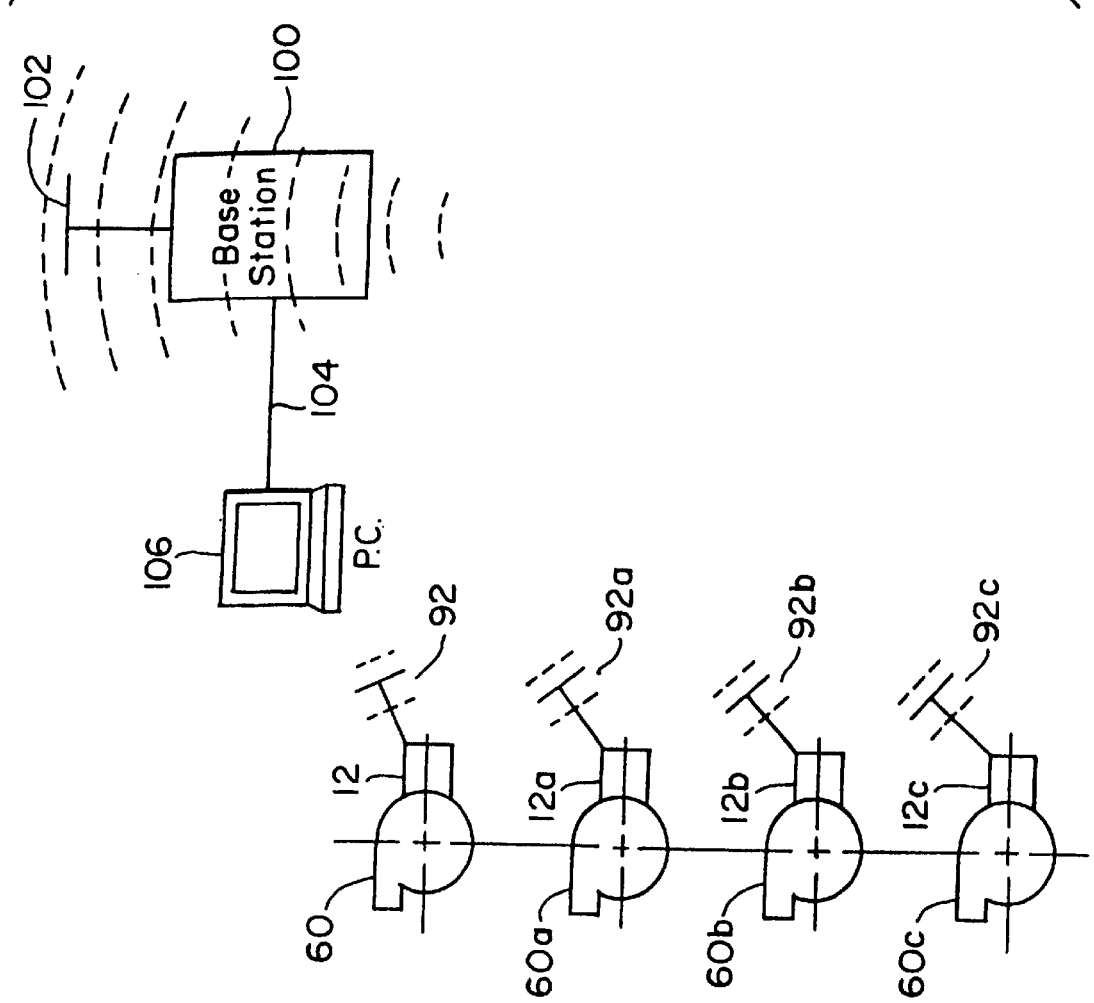
FIG. 4 is a schematic diagram showing a number of the detector assemblies of FIG. 3 in a wireless communication system with a base station served by a computer.

Detector assembly 12 may include a chamber 70, FIG. 3, in upper portion 48 which houses a number of sensor components. Temperature sensor 72 connects with temperature probe 54. Pressure transducer 74 has access through passage 76 to port 46 and bore 0 for sensing the pressure in the area of seal 16. Accelerometer device 78 is connected directly to the top wall 80 of upper portion 48 of detector assembly 12 so that it connects directly through upper wall 80, side cylindrical wall 82 and lower portion 48 to seal housing 14 for directly sensing the vibration in the vicinity of seal assembly 16. Temperature sensor 72, pressure transducer 74 and accelerometer device 78 may each be connected through cables 84, 86 and 88, respectively, to a signal conditioning and communications unit 90 which is connected to antenna 92 for transmitting the sensed conditions back to a central station or host computer. Signal conditioning and communications unit 90 may be simply a transmitter which constantly broadcasts its data accompanied by its identifying code, or it may include a receiver and transmitter for communicating via a handshake protocol with a central station or host computer. Signal conditioning and communication unit 90 may include a microprocessor such as a Motorola 688C11F1 microcontroller and a radio transceiver such as a Digital Wireless Corporation WIT2400M transceiver. Pressure transducer 74 may be an EG &G Model 96 or 97 pressure sensor and temperature sensor 72 may be a thermocouple such as an Omega JMTSS-125-U-6. Accelerometer device 78 may be a single accelerometer which senses accelerations in one, two or three mutually perpendicular axes or it may be a triaxial accelerometer such as the EG &G Model 3355 which includes three accelerometers with mutually perpendicular axes. An entire network of detector assemblies 12, 12a, 12b, 12c, FIG. 4, may communicate with one or more base station transceivers 100 each having its own antenna 102 and a cable connection 104 to a central computer 106 such as a PC Model P4D-66 made by Gateway. Thus, the seal and the sensors are integral and require no special installation procedures. The installation of the seal automatically includes the installation of the sensors. Moreover, the sensor seals, once installed, monitor both the condition of the seal and the pump in which the seal is installed simultaneously. Since the condition of the seal is indicative of the condition of the pump and vice versa, the instant invention uniquely monitors both the condition of the seal and the pump without the need for external sensors.

Another feature of the present invention is the use of a controller having the ability to store and analyze the data collected from the accelerator devices, acoustic sensors, pressure transducers and temperature sensors. The controller can be a Programmable Logic Controller (PLC) or a computer such as a Personal Computer (PC). The use of a Programmable Logic Controller is preferred over the Personal Computer for its reliability. It is also preferred that the controller be scalable. This would then allow the controller to be up-graded from a stand-alone unit to a networked sensor node in an enterprise system. The controller is equipped with analog to digital converters for converting the analog signals received from the sensors.

Figure 5:
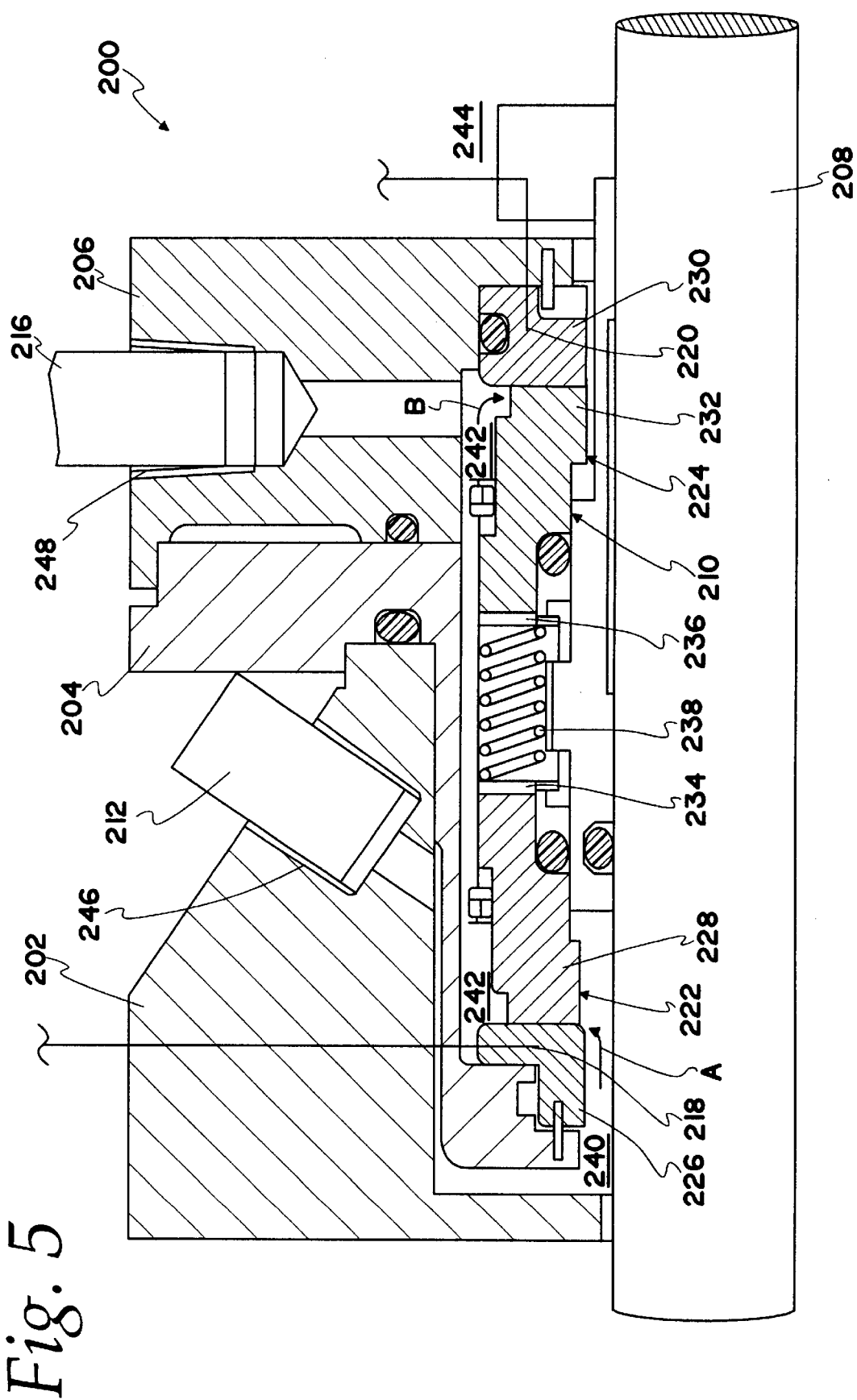
FIG. 5 is a side sectional view of a seal system having a number of sensors for providing data to a controller to monitor and evaluate the seal performance of a double seal assembly.

An embodiment of a seal system having a number of sensors and a controller to monitor evaluate the seal performance of a double seal assembly is illustrated in FIG. 5. The seal system 200 includes a stuffing box 202, a spacer 204, a seal housing or also known as a gland plate 206, a rotating shaft 208, a double seal assembly 210, a baseline plug sensor 212, an intermediate plug sensor 216, two thermocouples 218 and 220, a controller (not shown), at least one display unit (not shown) and an input unit (not shown).

The double seal assembly 210 consists of two single seals mounted back-to-back. The double seal assembly 210 sealingly engages the rotating shaft 208 to prevent fluid leakage. For the purpose of this application, fluid is defined as any matter in its liquid or vapor state. The double seal assembly 210 has an inboard seal 222 and an outboard seal 224. The inboard seal 222 has an inboard mating ring 226. Axially outwardly of the inboard mating ring 226 is an inboard primary ring 228. The outboard seal 224 has an outboard mating ring 230. Axially inwardly of the outboard mating ring 230 is an outboard primary ring 232. Axially outwardly of the inboard primary ring 228 is an inboard disk 234. Axially inwardly of the outboard primary ring 232 is an outward disk 236. Located axially between the inboard disk 234 and the outboard disk 236 is a spring 238 biasing the inboard primary ring 228 toward the inboard mating ring 226 and biasing the outboard primary ring 232 toward the outboard mating ring 230.

The double seal assembly 210 of the present invention operates as follows. The seal system 200 defines a process zone 240 upstream of the inboard seal 222 and an intermediate zone 242 between the inboard seal 222 and the outboard seal 224. An atmosphere condition 244 exists downstream of the outboard seal 224 or outside the seal system 200. The double seal assembly 210 functions to prevent the escape of fluid located in the process zone 240 to the atmosphere 244. To accomplish such function, the double seal assembly 210 has two sets of seal mating surfaces which limit escape of fluid from one zone to another zone. The first set of seal mating surfaces is the inward surface of the inboard primary ring 228 which engages with the outward surface of the inboard mating ring 226. The engagement of the inboard primary ring 228 with the inboard mating ring 226 limits escape of fluid from the process zone 240 to the intermediate zone 242 as shown by arrow A.

To further limit the escape of fluid from the process zone 240 to the intermediate zone 242, a barrier fluid can be supplied to the intermediate zone 242. The supply of barrier fluid into the intermediate zone 242 causes the intermediate zone 242 to have a pressure higher than the pressure of the process zone 240. If a barrier fluid is supplied to the intermediate zone 242, the seal system 200 would include an inlet port (not shown) defined in the stuffing box, the spacer or the seal housing for supplying the barrier fluid into the intermediate zone and an outlet port (not shown) defined in the stuffing box, the spacer or the seal housing for discharging the barrier fluid from the intermediate zone. The barrier fluid also serves to remove heat from the seal assembly 210.

If a barrier fluid not supplied to the intermediate zone 242, the pressure of the intermediate zone 242 is lower than the pressure of the process zone 240.

The second set of seal mating surfaces is the outward surface of the outboard primary ring 232 which engages with the inward surface of the outboard mating ring 230. The engagement of the outboard primary ring 232 with the outboard mating ring 230 limits the escape of fluid from the intermediate zone 242 to the atmosphere 244 as shown by arrow B.

The baseline plug sensor 212 is mounted to a monitoring port 246 defined in the stuffing box 202. The baseline plug sensor 212 measures the pressure and temperature of the fluid within the process zone 240. The pressure of the process zone 240 and the temperature of the process zone 240 primarily act as reference pressure and temperature providing for the baseline environment for the seal system 200. It should be noted that while the baseline plug sensor 212 is mounted on the stuffing box 202 in this embodiment, the baseline plug sensor 212 may be mounted on any other portion of the seal system 200 which can measure the pressure and temperature of the process zone 240 or any other pressure and temperature which can act as reference pressure and temperature.

The baseline plug sensor 212 is an integrated pressure transducer and temperature sensor.

The baseline plug sensor 212 should contain no electronics so that it can withstand temperatures up to 500 degrees F. It is preferred that the baseline plug sensor 212 has an operating pressure between 20 to 600 psi, a pressure temperature limit of 500 degree F and an input/output resistance of 5000 Ohms (nominal). The baseline plug sensor's pressure sensing element consists of strain gages bonded to a diaphragm and wired into a full Wheatstone bridge. The strain due to pressure causes a change in resistance that unbalances the bridge and produces an electrical output proportional to the applied pressure. The input/output resistance of the bridge should be 5000 Ohms nominal. A short pigtail exits from the top of the plug sensor and is spliced to a four conductor shielded Teflon insulated wire for connection to the signal conditioning equipment. The temperature sensing element of the baseline plug sensor consists of a thermocouple welded to the pressure sensing element. The thermocouple leads exit the baseline plug sensor together with pressure signal leads.

The intermediate plug sensor 216, identical in construct to the baseline plug sensor 212, is mounted to a monitoring port 248 defined in the seal housing 206. The intermediate assembly plug sensor 216 measures the pressure and temperature of the fluid in the intermediate zone 242.

The temperatures in the vicinity of the inboard seal 222 and the outboard seal 224 are measured to determine the performance of the seal assembly. FIG. 5 illustrates thermocouples 218 and 220 attached to the face of the inboard mating ring 226 and the face of the outboard mating ring 230. The temperature is measured with a standard metal sheathed J or K type thermocouple (optional RTD) which is inserted through a port defined in the stuffing box, the spacer or the seal housing such that the thermocouple is near or in contact with the corresponding mating ring 226 or 230. A coiled J type thermocouple may also be used. The relationship between the temperature of the fluid in the process zone 240 and temperatures of in the vicinity of the inboard seal 222 and the outboard seal 224 provides insight into how the seal assembly 210 is operating. The rate of change of the temperatures in the vicinity of the inboard seal 222 and the outboard seal 224 can also provide insight into the performance of the seal assembly 210. Measuring the temperature in the vicinity of the seals by attaching thermocouples 218 and 220 to the faces of the mating rings 226 and 230 is the preferred method. However, attaching thermocouples to the faces of the mating rings may not always be feasible. Therefore, an alternative method to measuring the temperature in the vicinity of seals is to use probes extending toward the seal mating surfaces of the inboard seal 222 and the outboard seal 224 but not touching the inboard seal 222 or the outboard seal 224. Such probes are illustrated in FIGS. 1–3.

Although not shown in FIG. 5, an accelerometer device and/or a liquid leak detector can be optionally used to evaluate the seal performance.

Figure 6:
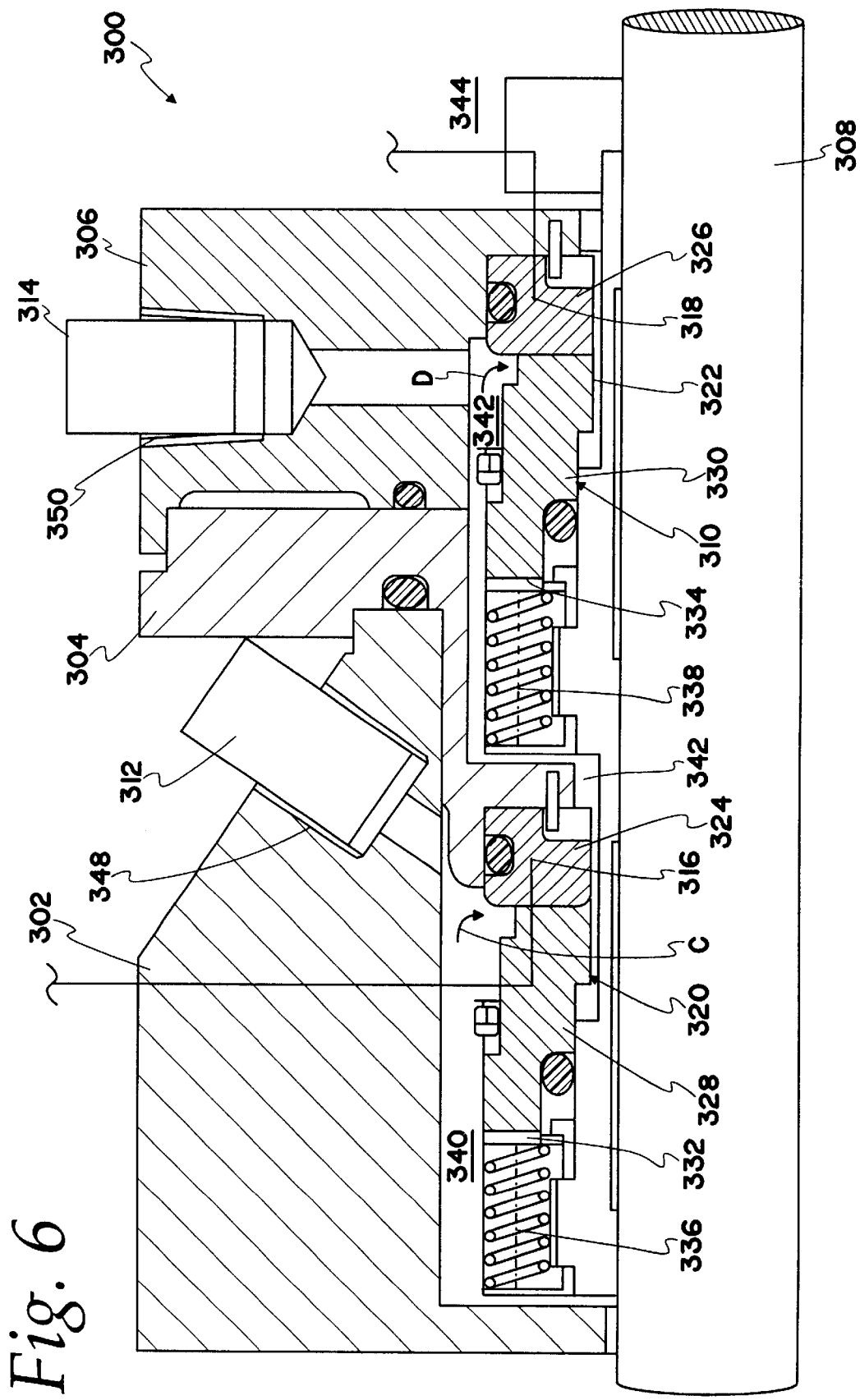
FIG. 6 is a side sectional view of a seal system having a number of sensors for providing data to a controller to monitor and evaluate the seal performance of a tandem seal assembly.

FIG. 6 illustrates a seal system having a number of sensors for providing data to a controller to monitor and evaluate the seal performance of a tandem seal assembly. The seal system 300 includes a stuffing box 302, a spacer 304, a seal housing or also known as a gland plate 306, a rotating shaft 308, a tandem seal assembly 310, a baseline plug sensor 312, an intermediate plug sensor 314, two thermocouples 316 and 318, a controller (not shown), at least one display unit (not shown) and an input unit (not shown).

The tandem seal assembly 310 consists of two single seals, an inboard seal 320 and an outboard seal 322, mounted in the same direction. Each seal 320 and 322 has a mating ring 324 and 326. Axially inwardly of each mating ring 324 and 326 is a primary ring 328 and 330. Axially inwardly of each primary ring 328 and 330 is a disk 332 and 334. Located axially inwardly of each disk 332 and 334 is a spring 336 and 338 biasing the primary ring 328 and 330 toward the mating ring 324 and 326.

The tandem seal assembly 310 of the present invention operates as follows. The seal system 300 defines a process zone 340 upstream of the inboard seal 320 and an intermediate zone 342 between the inboard seal 320 and the outboard seal 322. An atmosphere condition 344 exists downstream of the outboard seal 322 or outside the seal system 300. The tandem seal assembly 310 functions to limit the escape of fluid located in the process zone 340 to the atmosphere 344.

To accomplish such function, the tandem seal assembly 310 has two sets of seal mating surfaces which limit escape of fluid from one zone to another zone. The first set of seal mating surfaces is the outward surface of the inboard primary ring 328 which engages with the inward surface of the inboard mating ring 324. The engagement of the inboard primary ring 328 with the inboard mating ring 324 limits escape of fluid from the process zone 340 to the intermediate zone as shown by arrow C. Without buffer fluid supplied to the intermediate zone, the pressure of the intermediate zone 342 is lower than the pressure of the process zone 340.

The second set of seal mating surfaces is the outward surface of the outboard primary ring 330 which engages with the inward surface of the outboard mating ring 326. The engagement of the outboard primary ring 330 with the outboard mating ring 326 limits the escape of fluid from the intermediate zone 342 to the atmosphere 344 as shown by arrow D.

The baseline plug sensor 312 is mounted to a monitoring port 348 defined in the stuffing box 302. The baseline plug sensor 312 measures the pressure and temperature of the fluid within the process zone 346. The pressure of the process zone 340 and the temperature of the process zone 340 primarily act as reference pressure and temperature providing for the baseline environment for the seal system 300. It should be noted that while the baseline plug sensor 312 is mounted on the stuffing box 302 in this embodiment, the baseline plug sensor 302 may be mounted on any other portion of the seal system 300 which can provide a baseline environment for the seal system. The baseline plug sensor 312 is identical to the baseline plug sensor 212 disclosed in the embodiment illustrated in FIG. 5.

The intermediate plug sensor 314, identical in construct to the baseline plug sensor 312, is mounted to a monitoring port 350 defined in the seal housing. The intermediate assembly plug sensor 314 measures the pressure and temperature of the fluid in the intermediate zone 342.

The temperature in the vicinity of each seal 320 and 322 is measured by a thermocouple embedded near or on the corresponding mating ring 324 and 326. The thermocouples 316 and 318 are identical to the thermocouples 218 and 220 disclosed in the embodiment illustrated in FIG. 5. Measuring the temperature in the vicinity of the seals 320 and 322 by attaching thermocouples 316 and 318 to the faces of the mating rings 324 and 326 is the preferred method. However, attaching thermocouples to the faces of the mating rings may not always be feasible. Therefore, an alternative method to measuring the temperature in the vicinity of seals is to use probes extending toward the seal mating surfaces of the inboard seal 320 and the outboard seal 322 but not touching the inboard seal 320 or the outboard seal 322. Such probes are illustrated in FIGS. 1–3.

An accelerometer device and/or a liquid leak detector can be optionally used to evaluate the seal performance.

Figure 7:
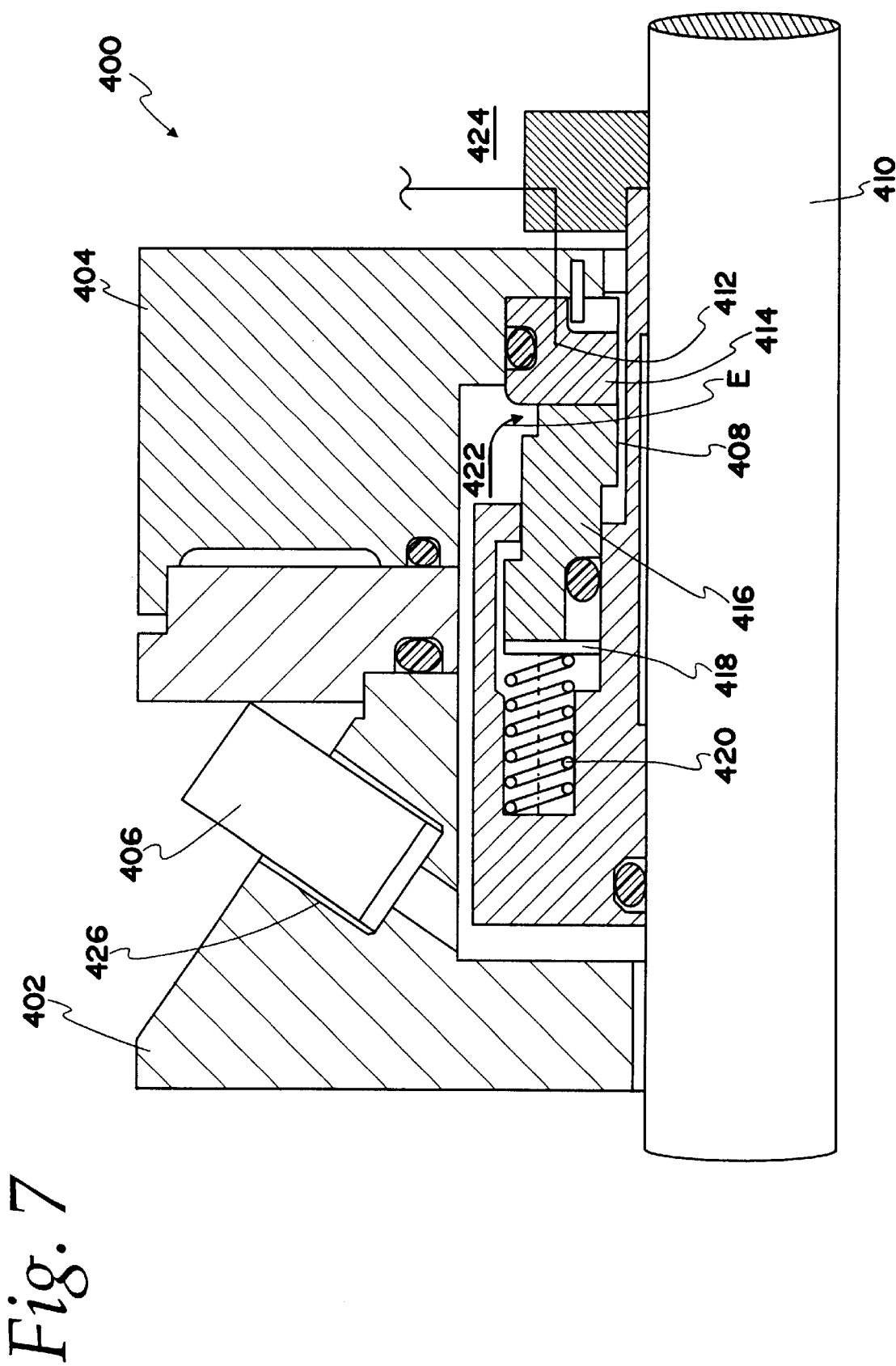
FIG. 7 is a side sectional view of a seal system having a number of sensors for providing data to a controller to monitor and evaluate the seal performance of a singe seal assembly.

FIG. 7 illustrates a seal system having a number of sensors for providing data to a controller to monitor and evaluate the seal performance of a single seal assembly. The seal system 400 includes a stuffing box 402, a seal housing or also known as a gland plate 404, a base line plug sensor 406, a single seal assembly 408, a rotating shaft 410, a thermocouple 412, a controller (not shown), at least one display unit (not shown) and an input unit (not shown).

The single seal assembly 408 is located in the seal housing for sealingly engaging the rotating shaft to prevent fluid leakage. The singe seal assembly 408 has a mating ring 414. Axially inwardly of the mating ring 414 is a primary ring 416. Axially inwardly of the primary ring 416 is a disk 418. Located axially inwardly of the disk 418 is a spring 420 biasing the primary ring 416 toward the mating ring 414.

The single seal assembly 408 of the present invention operates as follows. The seal system 400 defines a process zone 422 upstream of the seal 408. An atmosphere condition 424 exists downstream of the seal 408 or outside the seal system 400. The seal assembly 408 functions to prevent the escape of fluid located in the process zone 422 to the atmosphere 424. To accomplish such function, the seal assembly 408 has a mating surface which limit escape of fluid from the process zone 422 to the atmosphere 424. The set of seal mating surfaces is the outward surface of the primary ring 416 which engages with the inward surface of the mating ring 414. The engagement of the primary ring 416 with the mating ring 414 limits escape of fluid from the process zone 422 to the atmosphere 424 as shown by arrow E.

The baseline plug sensor 406 is mounted to a monitoring port 426 defined in the stuffing box 402. The baseline plug sensor 406 measures the pressure and temperature of fluid within the process zone 422. The pressure of the process zone 422 and the temperature of the process zone 422 primarily act as reference pressure and temperature providing for the baseline environment for the seal system 400. It should be noted that while the baseline plug sensor 406 is mounted on the stuffing box 402 in the this embodiment, the baseline plug sensor 402 may be mounted on any other portion of the seal system 400 which can provide a baseline environment for the seal system. The baseline plug sensor 406 is identical to the baseline plug sensor 212 disclosed in the embodiment illustrated in FIG. 5.

The temperature in the vicinity of the seal 408 is measured by a thermocouple 412 embedded near or on the mating ring 414. The thermocouple 412 is identical to the thermocouples 218 and 220 disclosed in the embodiment illustrated in FIG. 5. Measuring the temperature in the vicinity of the seal 408 by attaching thermocouple 412 to the face of the mating ring 414 is the preferred method. However, attaching a thermocouple to the face of the mating ring may not always be feasible. Therefore, an alternative method to measuring the temperature in the vicinity of seal is to use a probe extending toward the seal mating surfaces of the seal 408 but not touching the seal 408. Such probe is illustrated in FIGS. 1–3. An accelerometer device and/or a liquid leak detector can be optionally used to evaluate the seal performance.

The present invention further comprises a LCD display unit. For seal systems having a double seal assembly or tandem seal assembly, the LCD display unit displays the value of the baseline temperature, the baseline pressure, the intermediate temperature, the intermediate pressure, the temperature in vicinity of the inboard seal and the temperature in vicinity of the outboard seal. For seal systems having a single seal assembly, the LCD display unit displays the value of the baseline temperature, the baseline pressure and the temperature in vicinity of the seal. It is preferable for the LCD display unit to display the pressures in a range between 0 to 600 psig and the temperatures in a range between −40 to 600 degree F. It also preferred for the LCD display unit to display an upset or an unstable. An unstable condition is when the seal is running in questionable conditions requiring the seal's environment to be evaluated and the seal carefully monitored. An upset condition is when the seal has reached a precarious condition requiring action to be taken to rectify the situation. The LCD display unit may display an upset or an unstable condition by stating that an upset or an unstable condition has occurred. Alternatively the LCD display unit can bring to attention, such as highlighting or flashing, the reading(s) providing the basis that an upset or an unstable condition has occurred.

An LED display unit can also be used, in conjunction with the LCD display unit or alone, to warn of local upset and/or unstable conditions. A two color light system can be used. A two color light system has a green light to indicate normal conditions and a red light to indicate upset conditions. Alternatively, a three color light system can be used. A three color light system has a green light to indicate normal conditions, a yellow light to indicate unstable conditions and a red light to indicate upset conditions. It is preferred that once an upset condition has been triggered, the display of an upset condition would remain until a reset switch is pushed.

It is desirable that should more than one seal systems be monitored and analyzed by a single controller, the display unit would have the capability to display the corresponding temperature/pressure values and unstable/upset conditions for each individual seal system.

The system also includes an input unit attached to the controller. The input unit may be a keyboard or a touch screen LCD display unit. A touch screen LCD display unit is preferred over a keyboard due to the ability of using a single integral unit serving as both the display unit and the input unit. The input unit allows an operator to change the display parameters on the display unit. Furthermore, the input unit allows an operator to adjustably input set values into the controller for various temperatures and pressures and constants which would trigger an upset condition. The set values and constants would depend upon the seal type and the environment in which the seal would operate.

An upset condition would be triggered when one or more of the following conditions is met:

Temperature of fluid in process zone>Set point of temperature of fluid in process zone.

Pressure of fluid in process zone>High set point of pressure of fluid in process zone.

Pressure of fluid in process zone<Low set point of pressure of fluid in process zone.

Temperature of fluid in intermediate zone>Set point of temperature of fluid in intermediate zone (if a double or tandem seal assembly is used).

Pressure of fluid in intermediate zone>High set point of pressure of fluid in intermediate zone (if a double or tandem seal assembly is used).

Pressure of fluid in intermediate zone<Low set point of pressure of fluid in intermediate zone (if a double or tandem seal assembly is used).

Pressure of fluid in intermediate zone<Pressure of fluid in process zone+Set constant (if a double or tandem seal assembly used and a barrier fluid is inserted into the intermediate zone).

Pressure of fluid in intermediate zone>Pressure of fluid in process zone+Set constant (if a double or tandem seal assembly is used and a barrier fluid is not inserted into the intermediate zone).

Temperature in vicinity of inboard seal>Set point of temperature in vicinity of inboard seal (if a double or tandem seal assembly is used).

Temperature in vicinity of inboard seal>Temperature of fluid in intermediate zone+Set constant (if a double or tandem seal assembly is used).

Temperature in vicinity of inboard seal>Temperature of fluid in process zone+Set constant (if a double or tandem seal assembly is used).

Temperature in vicinity of outboard seal>Set point of temperature in vicinity of outboard seal (if a double or tandem seal assembly is used).

Temperature in vicinity of outboard seal>Temperature of fluid in intermediate zone+Set constant (if a double or tandem seal assembly is used).

Temperature in vicinity of outboard seal>Temperature of fluid in process zone+Set constant (if a double or tandem seal assembly is used).

Temperature in vicinity of seal>Set point of temperature in vicinity of seal (if singe seal assembly is used).

Temperature in vicinity of seal>Temperature of fluid in process zone+Set constant (if a singe seal assembly is used).

Optionally, an upset condition would occur when a sensor failure is detected. The detection of sensor failure could be used to over-ride other upset conditions, in particularly if other upset conditions are based on a measurement from the failed sensor. To detect a sensor failure, it is preferable to have a small current running to and from the sensor. If no return signal is detected, it is likely that there is an open circuit to or from the sensor.

The controller also has an internal counter keeping track of the number of time an upset condition has occurred. The counter can be displayed on an "alarm panel" or an "alarm screen" on the LCD display unit. The internal counter monitors and records the time duration of each fault.

The counter can also assess the long term durability and survivability of the seal.

The controller not only can display and analyze the data received from the sensors for upset conditions, the controller can also save the data received from the sensors and process stored historical data. The built in processing functions of the controller include, but are not limited to, Arithmetic mean, FFT, Filtering (low-pass, high-pass, median, etc.), Differentiation, RMS, Standard Deviation, Linear Trending and Histograms. The trending function would include historical trending using selected stored data points to estimate the trend of a variable and using this data to predict is an alarm condition will occur in the near future.

Trend exceeds present alarm limit.

Rate-of-change of temperature/pressure exceeds set limit.

An optional feature of the present invention is to remedy the upset condition and/or shut down the motor for operating the system. An example of remedying the upset condition would be to increase the flow rate of buffer fluid to the intermediate zone and thus cool the temperature of the component causing the upset condition. Shutting down the motor for operating the system stops the rotation of the shaft thus preventing further leakage of fluid through the seal assembly. The shut down feature is particularly advantages should leakage of fluid through the seal assembly creates a dangerous environment. The shut down feature also forces an operator to remedy the cause of the upset condition.

Although specific features of this invention are shown in some drawings and not others and discussed in some embodiments and not others, this is for convenience only as each feature may be combined with any or all of the other features in accordance with the invention.

Other embodiments will occur to those skilled in the art and are within the following claims:

What is claimed is:

1. A monitoring seal system comprising:

a seal housing;

a seal assembly for sealingly engaging a rotary shaft to prevent fluid leakage between the shaft and the housing, said seal assembly having at least one seal, said seal having a primary ring and a mating ring;

a temperature sensor for sensing temperature in vicinity of said seal;

an input unit for manually and adjustably inputting a set value of a temperature or a set constant for determining an upset condition; and a controller capable of receiving, storing and analyzing data, attached to said input unit to receive input therefrom and for receiving a signal from said temperature sensor, for comparing to said input value thereby determining whether an upset condition has occurred based on at least said temperature in vicinity of said seal and said set temperature or set constant input into said input unit.

2. The monitoring seal system of claim 1 in which an upset condition has occurred when said temperature in vicinity of said seal is greater than a set temperature.

3. The monitoring seal system of claim 1 further comprising a temperature sensor for sensing a baseline temperature, wherein said controller determines whether an upset condition has occurred based on at least said temperature in vicinity of said seal and said baseline temperature.

4. The monitoring seal system of claim 3 in which an upset condition has occurred when said temperature in vicinity of said seal is greater than said baseline temperature plus a set constant.

5. The monitoring seal system of claim 3 in which an upset condition has occurred when said baseline temperature is greater than a set temperature.

6. The monitoring seal system of claim 1 further defines a process zone upstream of said seal assembly, in which said baseline temperature is the temperature in the process zone.

7. The monitoring seal system of claim 1 in which said temperature sensor for sensing temperature in vicinity of said seal is a thermocouple attached to face of said mating ring.

8. The monitoring seal system of claim 1 in which said temperature sensor for sensing temperature in vicinity of said seal is a thermocouple attached to terminal end of a probe, said probe extends toward said seal but not touching said seal.

9. A monitoring seal system comprising:

a seal housing;

a seal assembly for sealingly engaging a rotary shaft to prevent fluid leakage between the shaft and the housing, said seal assembly having at least one seal, said seal having a primary ring and a mating ring;

a temperature sensor for sensing temperature in vicinity of said seal;

an input unit for manually and adjustably inputting a set value of a temperature or a set constant for determining an upset condition; and a controller capable of receiving, storing and analyzing data, attached to said input unit to receive input therefrom and for receiving a signal from said temperature sensor, for comparing to said input value thereby determining whether an upset condition has occurred based on at least said temperature in vicinity of said seal and said set temperature or set constant input into said input unit said assembly further having a second seal, said seal and said second seal defining an intermediate zone between the two seals, the seal system further comprising a temperature sensor for sensing temperature in vicinity of said second seal and a temperature sensor for sensing temperature in the intermediate zone, wherein said input unit is capable of manually and adjustably inputting a set value for a temperature in the vicinity of said second seal and a value for a temperature in said intermediate zone or a set constant, and said controller receives data from said sensors in the vicinity of said second seal and said intermediate zone and determines whether an upset condition has occurred based on at least said temperature in vicinity of said seal, temperature in vicinity of said second seal and temperature in intermediate zone.

10. The monitoring seal system of claim 9 in which said temperature sensor for sensing temperature in intermediate zone is mounted to said seal housing.

11. The monitoring seal system of claim 9 in which an upset condition has occurred when said temperature in vicinity of said seal is greater than said temperature in intermediate zone plus a set constant.

12. The monitoring seal system of claim 11 in which an upset condition has occurred when said temperature in vicinity of said second seal is greater than said temperature in intermediate zone plus a second set constant.

13. The monitoring seal system of claim 1 further comprising a display unit.

14. The monitoring seal system of claim 13 wherein said display unit is a LCD display unit.

15. The monitoring seal system of claim 13 wherein said display unit is a LED display unit.

16. The monitoring seal system of claim 13 wherein said display unit displays occurrence of an upset condition.

17. A monitoring system comprising:

a seal housing; sa seal assembly for sealingly engaging a rotary shaft to prevent fluid leakage between the shaft and housing, said seal assembly having two seals defining an intermediate zone of said seal system between the two seals;

a temperature sensor for sensing temperature in said intermediate zone;

an input unit for manually and adjustably inputting a set value of a temperature or a set constant for determining an upset condition; and a controller capable of receiving, storing and analyzing data, attached to said input unit to receive input therefrom and for receiving a signal from said temperature sensor for comparison to said input value thereby determining whether an upset condition has occurred based on at least said temperature in said intermediate zone and said set temperature or set constant input into said input unit.

18. The monitoring seal system of claim 17 in which said temperature sensor is mounted to said seal housing.

19. The monitoring seal system of claim 17 in which an upset condition has occurred when said temperature in intermediate zone is greater than a set temperature.

20. A monitoring seal system comprising:

a seal housing;

a seal assembly for sealingly engaging a rotary shaft to prevent fluid leakage between the shaft and housing, said seal assembly having two seals defining an intermediate zone of said seal system between the two seals;

a pressure sensor for sensing pressure in said intermediate zone;

an input unit for manually and adjustably inputting a set value of a pressure or a set constant for determining an upset condition; and a controller capable of receiving, storing and analyzing data, attached to said input unit to receive input therefrom and for receiving a signal from said pressure sensor, for comparing to said input value thereby determining whether an upset condition has occurred based on at least said pressure in said intermediate zone and said set pressure or set constant input into said input unit.

21. The monitoring seal system of claim 20 in which said pressure sensor is mounted to said seal housing.

22. The monitoring seal system of claim 20 in which an upset condition has occurred when said pressure in said intermediate zone is greater than a set pressure.

23. The monitoring seal system of claim 20 in which an upset condition has occurred when said pressure in said intermediate zone is less than a set pressure.

24. The monitoring seal system of claim 20 further comprising a pressure sensor for sensing a baseline temperature, wherein said controller determines whether an upset condition has occurred based on at least said pressure in said intermediate zone and said baseline pressure.

25. The monitoring seal system of claim 24 further defines a process zone upstream of said seal assembly, in which said baseline pressure is the pressure in the process zone.

26. The monitoring seal system of claim 24 in which an upset condition occurs when said pressure in vicinity of said seal assembly is greater than said baseline pressure plus a set constant.

27. The monitoring seal system of claim 24 wherein a buffer fluid is supplied to the intermediate zone, wherein an upset conditions occurs when said pressure in intermediate zone is less than said baseline pressure plus a set constant.

28. The monitoring seal system of claim 24 in which an upset condition has occurred when said baseline pressure is greater than a set pressure.

29. The monitoring seal system of claim 24 in which an upset condition has occurred when said baseline pressure is less than a set pressure.

30. The monitoring seal system of claim 20 further comprising a display unit.

31. A method for monitoring a seal system having a rotating shaft, a seal housing and a seal assembly having at least one seal, said seal having a primary ring and one mating ring, said seal assembly sealingly engaging the rotating shaft to prevent fluid leakage between the shaft and housing; the method comprising the steps of:

provviding a sensor selected from the group consisting of sensor for sensing temperature in vicinity of said seal, sensor for sensing baseline temperature and sensor for sensing baseline pressure;

providing an input unit for manually and adjustably inputting a set value of a temperature, a set pressure, or a set constant for determining n upset condition;

providing a controller capable of receiving, storing analyzing data attached to the input unit to receive input therefrom and for receiving a signal from said sensor; and comparing said transmitted data to said input value for determining whether an upset condition has occurred based on at least said data transmitted from said sensor and said set temperature, set pressure, or set constant input into said input unit.

32. The method of claim 31 further comprising the steps of providing a display unit and displaying that an upset condition has occurred.

33. The method of claim 31 further comprising the step of stopping rotation of shaft should an upset condition be determined to have occurred.

34. A method for monitoring a seal system having a rotating shaft, a seal housing and a seal assembly having first and second seals defining an intermediate zone of said seal system between the two seals, each of said seals having one primary ring and one mating ring, said seal assembly located in said seal housing for sealingly engaging the rotating shaft to prevent fluid leakage between the shaft and housing, the method comprising the steps of:

providing a sensor selected from the group consisting of sensor for sensing temperature in vicinity of said first seal, sensor for sensing temperature in vicinity of said second seal, sensor for sensing temperature in said intermediate zone, sensor for sensing pressure in said intermediate zone, sensor for sensing baseline temperature and sensor for sensing baseline pressure;

providing an input unit for manually and adjustably inputting a set value of a temperature, a set pressure, or a set constant for determining an upset condition;

providing a controller capable of receiving, storing and analyzing data, said controller attached to said input unit to receive input therefrom and for receiving a signal from said sensor transmitting data from said sensor to said controller; and said controller mathematically comparing said sensed data to said set data for determining whether an upset condition has occurred based on at least said data transmitted from said sensor and said set temperature, set pressure or set constant input into said input unit.

35. The method of claim 34 further comprising the step of supplying a buffer fluid to the intermediate zone.

36. The method of claim 35 further comprising the step of increasing flow rate of buffer fluid to the intermediate zone should an upset condition be determined to have occurred.

* * * * *